Jan. 13, 1942.　　　W. H. LEHMBERG　　　2,269,461
RESPIRATOR
Filed Nov. 2, 1939　　　6 Sheets-Sheet 1
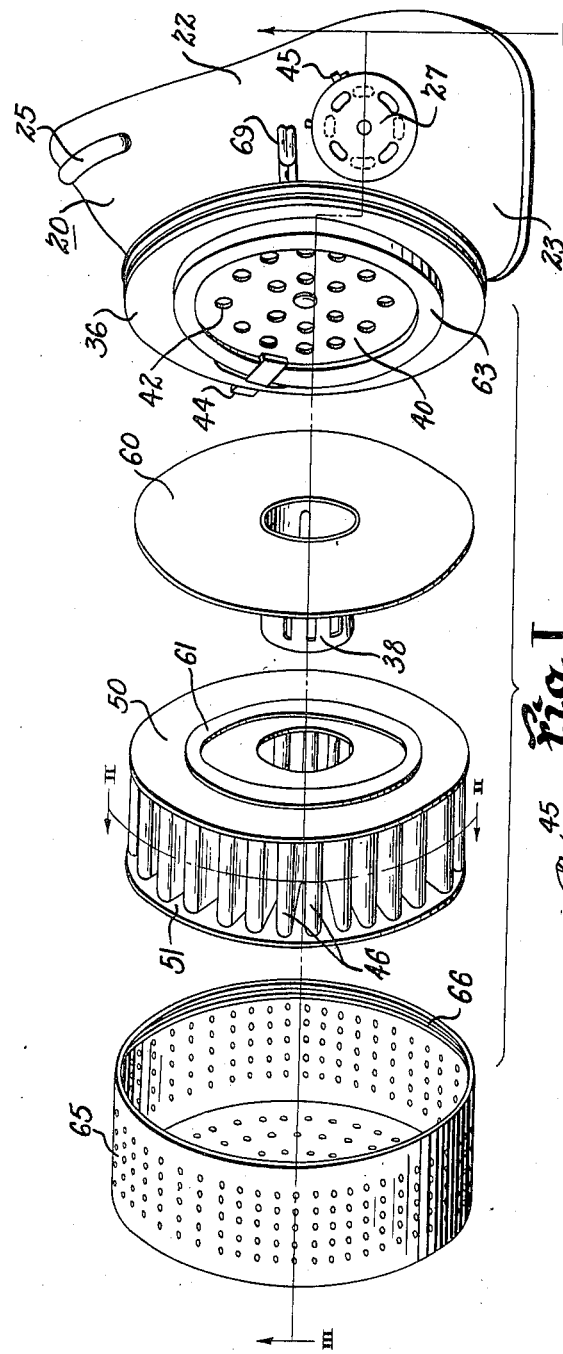
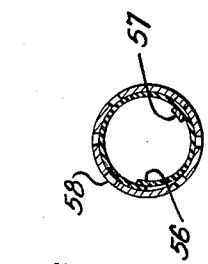
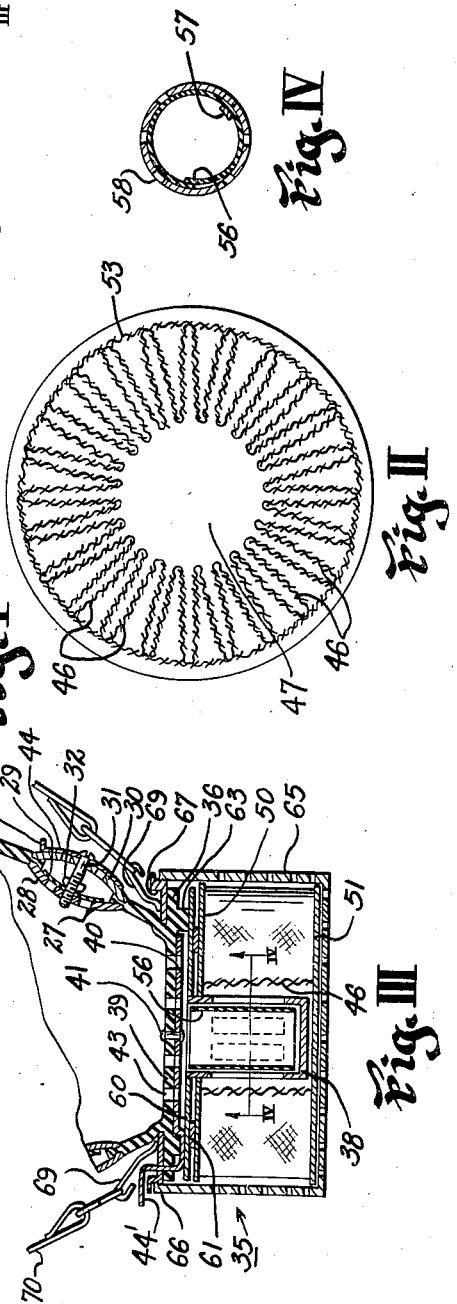
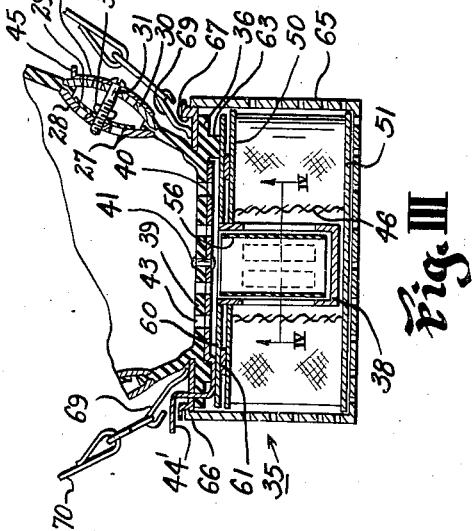
INVENTOR.
WILLIAM H. LEHMBERG
BY Harry H. Still
ATTORNEY.

Jan. 13, 1942.   W. H. LEHMBERG   2,269,461
RESPIRATOR
Filed Nov. 2, 1939   6 Sheets-Sheet 2
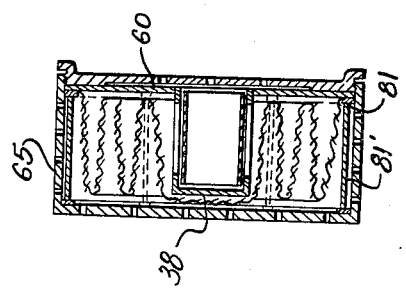
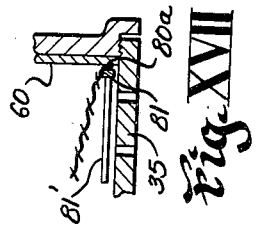
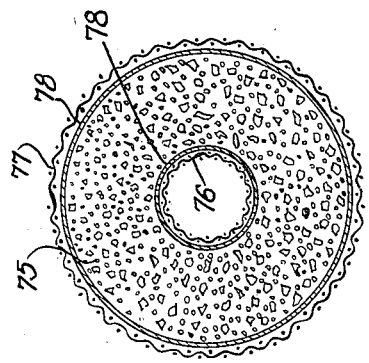
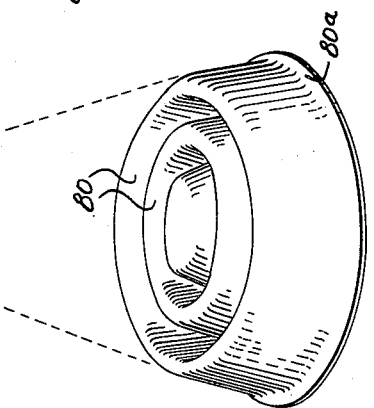
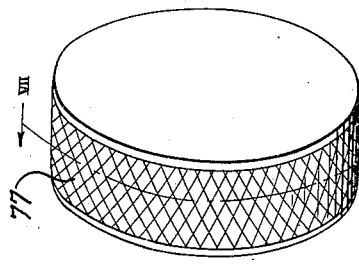
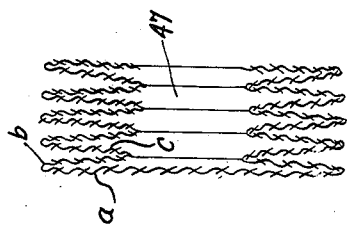
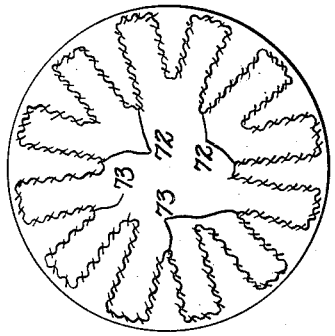
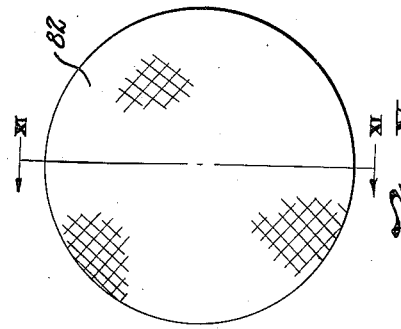
INVENTOR.
WILLIAM H. LEHMBERG
BY Harry H. Styll
ATTORNEY.

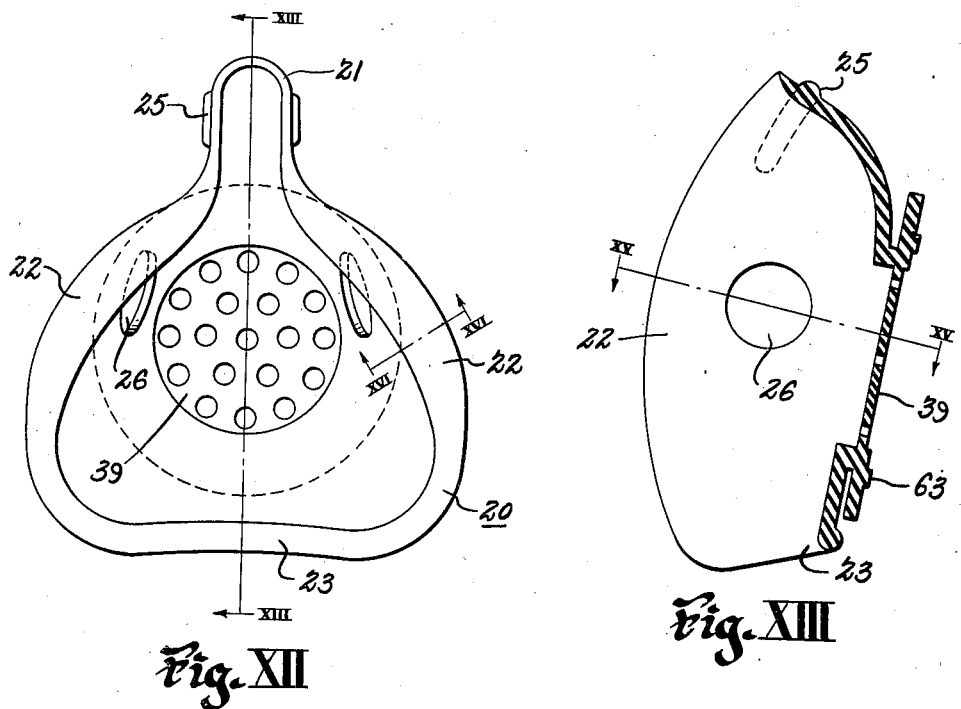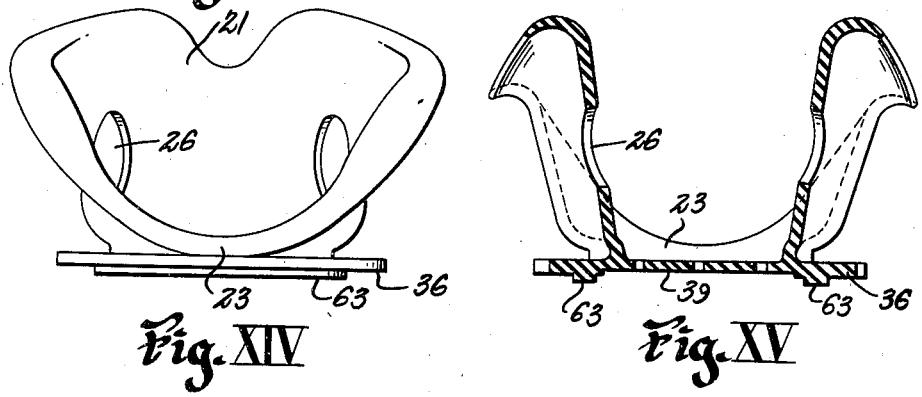

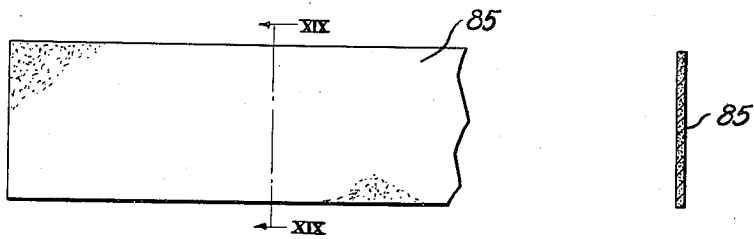
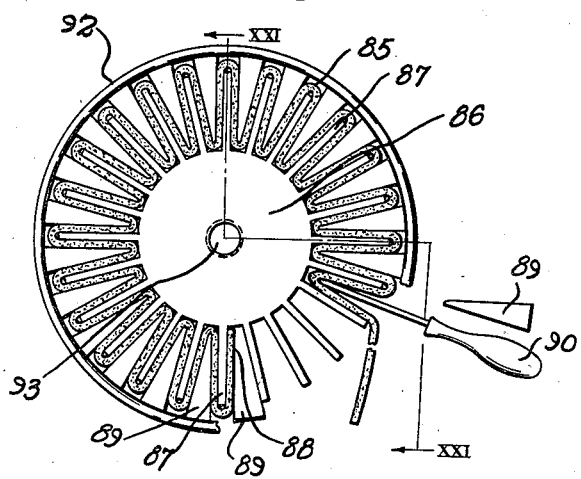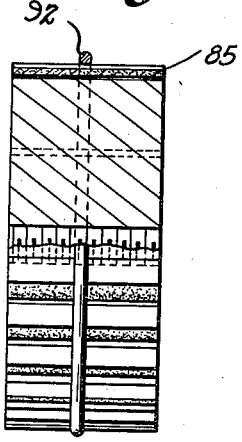
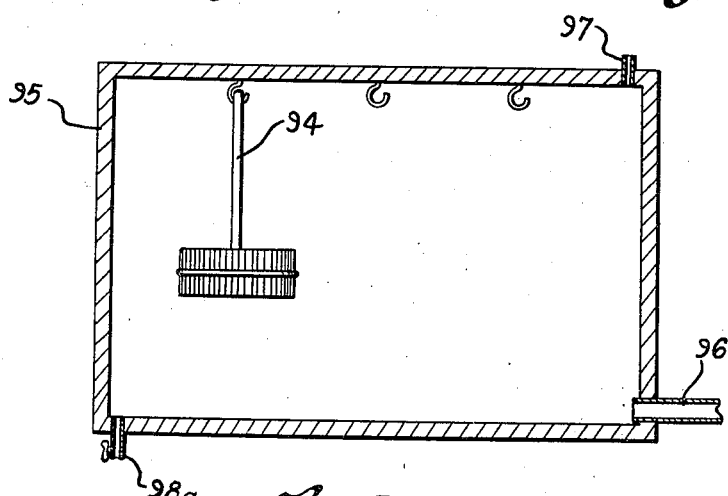

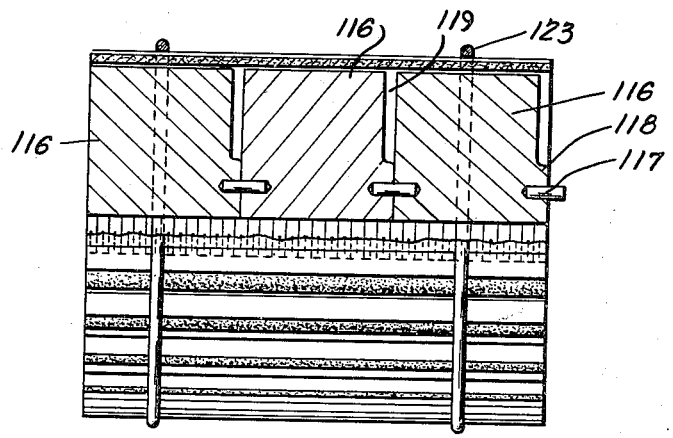
Fig. XXIII
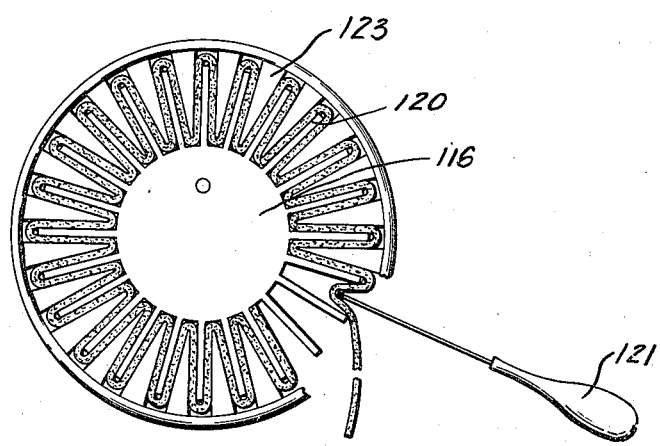
Fig. XXIV
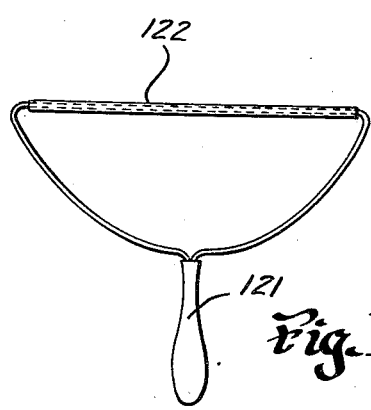
Fig. XXV

Jan. 13, 1942.  W. H. LEHMBERG  2,269,461
RESPIRATOR
Filed Nov. 2, 1939     6 Sheets-Sheet 6
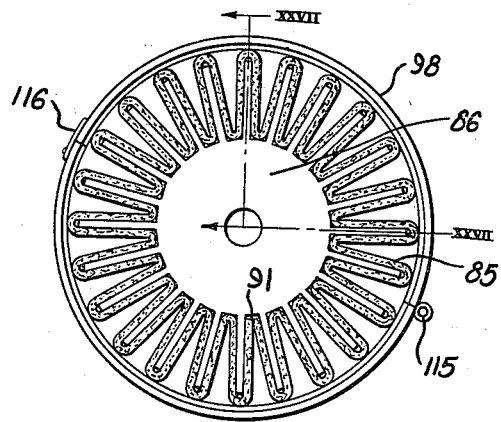
Fig. XXVI
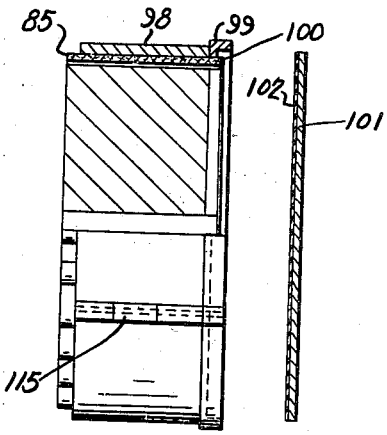
Fig. XXVII  Fig. XXVIII
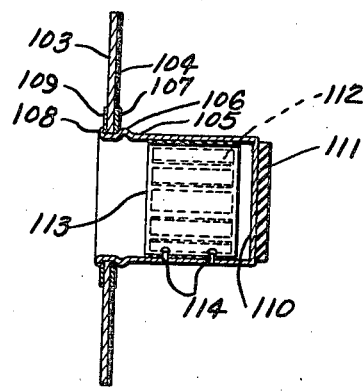
Fig. XXIX
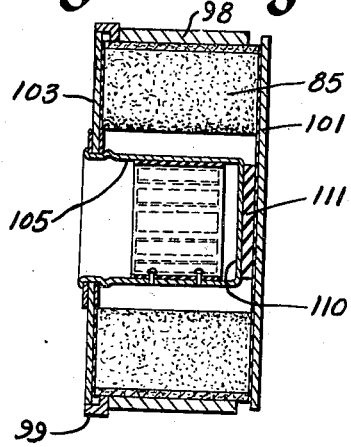
Fig. XXX
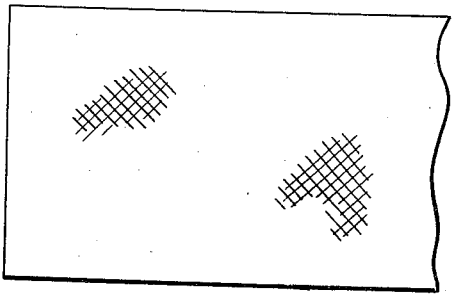
Fig. XXXI
INVENTOR.
WILLIAM H. LEHMBERG
BY Harry H. Styll
ATTORNEY.

Patented Jan. 13, 1942

2,269,461

UNITED STATES PATENT OFFICE 2,269,461

RESPIRATOR

William H. Lehmberg, Sturbridge, Mass., assignor to American Optical Company, Southbridge, Mass., a voluntary association of Massachusetts Application November 2, 1939, Serial No. 302,490

5 Claims. (Cl. 128—146)

The present invention relates to improvements in respirators and more particularly to respirators with which interchangeable filter units may cooperate so as to adapt any given respirator for various uses, such as for separating out dust, for freeing the air from noxious gasses, or for other desired purposes.

This application is a continuation in part of my copending application, Serial No. 102,139, filed September 23, 1936.

An object of the present invention is to provide maximum filtering efficiency in a compact respirator which interferes to a minimum extent with vision and with the comfort of the user.

A further object of the present invention is to make it possible by interchangeable filter units to render the same mask serviceable for a variety of purposes.

A further object of the present invention is to make it possible to test out the respirator in situ as to leaks, and then render the respirator operative without any change in the position of the mask on the face of the operator.

Another object is to provide novel means and method of forming a filter unit, of the character set forth above, which will have uniform filtering characteristics with an initially low resistance to breathing and a comparatively slow plugging rate in a compact area or volume.

Another object is to provide a novel method of forming filter means embodying a specially felted filter felt in contrast to woven felt material which is in ribbon-like form whereby the ribbon-like material may be fabricated to a given controlled shape and processed to retain said shape while maintaining the ribbon-like material in its original form as regards thickness, porosity and filtering characteristics.

Another object is to provide novel means and method of forming a plurality of such filter units simultaneously.

Another object is to provide a novel method of fabricating a filter unit of the character described whereby the joints of said unit will be in substantially equally spaced relation with each other and disposed in a given direction and retained in said relation by closure members which seal the opposed sides of the folds and to provide a novel arrangement of inhalation valve assembled with said filter unit with the housing for said valve functioning as means for retaining the closure members in positive spaced relation with each other so as to avoid crushing the filter material and torsional distortion thereof during use.

Another object is to provide an assembly arrangement for supporting the valve and for sealing the valve in fitted relation with the face piece so as to avoid the entrance of air into the face piece other than through the filter unit.

In the accompanying drawings, which illustrate my invention:

Fig. I is an exploded view of a preferred embodiment of respirator;

Fig. II is a transverse sectional view through a filter unit and taken on the line II—II of Fig. I;

Fig. III is a longitudinal sectional view through the parts of the respirator when in assembled relation, the section being taken on the line III—III of Fig. I;

Fig. IV is a transverse section through the inhalation valve and taken on the line IV—IV of Fig. III;

Fig. V is a view similar to Fig. II showing a modified type of filter unit;

Fig. VI is a perspective view of a filter unit containing granular absorptive material;

Fig. VII is a transverse section through this filter unit on the line VII—VII of Fig. VI;

Fig. VIII is a perspective view of a filter of generally conical shape (as indicated in broken lines) folded into nested convolutions;

Fig. IX is a longitudinal sectional view through a housing containing a filter of the type shown in Fig. VIII;

Fig. X is a view in end elevation of still another modified form of filter, this filter being of bellows type;

Fig. XI is a longitudinal section on the line XI—XI of Fig. X;

Fig. XII is a view in elevation of a mask forming part of the respirator, this view being taken so as to look into the interior of the mask;

Fig. XIII is a vertical sectional view taken on the line XIII—XIII of Fig. XII;

Fig. XIV is a bottom plan view of the mask;

Fig. XV is a sectional view through the cheeks of the mask taken on the line XV—XV of Fig. XIII;

Fig. XVI is a detailed sectional view through a rim of the mask taken on the line XVI—XVI of Fig. XII; and Fig. XVII is a fragmentary sectional view illustrating the arrangement for clamping the edge of the filter of Fig. VIII in its housing.

Fig. XVIII is a fragmentary face view of a strip of filtering material used in fabricating the filter;

Fig. XIX is a sectional view taken as on line XIX—XIX of Fig. XVIII;

Fig. XX is a side view of the filter fabricating means illustrating some of the steps of the process of manufacture;

Fig. XXI is a fragmentary sectional view taken as on XXI—XXI of Fig. XX looking in the direction indicated by the arrows;

Fig. XXII is a sectional view of a heating chamber in which the filter units are processed;

Fig. XXIII is a view generally similar to Fig. XXI illustrating a modified form of filter fabricating means;

Fig. XXIV is a side elevation of the device illustrated in Fig. XXIII;

Fig. XXV is a side view of a tool used in the fabrication of the filter units illustrated in Figs. XXIII and XXIV;

Fig. XXVI is a side elevation of the complete assembly of the filter fabricating means just prior to its being placed in the heating chamber illustrated in Fig. XXII;

Fig. XXVII is a fragmentary sectional view taken as on line XXVII—XXVII of Fig. XXVI;

Fig. XXVIII is a sectional view of one of the side closure members of the filter unit prior to its being attached to the folded filter means;

Fig. XXIX is a sectional view of the opposed closure member and spacing means for the side closure members which form a housing for the inhalation valve of the completed filter unit;

Fig. XXX is a sectional view showing the closure members of Figs. XXVIII and XXIX in assembled relation with the folded filter means just prior to the removal of the supporting and positioning collar for the side closure members; and Fig. XXXI is a fragmentary side elevation of a sheet material used in conjunction with the apparatus illustrated in Figs. XXIII and XXIV.

Heretofore, it has been the general rule in making respirators, to design a particular respirator for a particular need. In other words, a respirator which is to serve for absorbing noxious gasses, such as ammonia, carbon monoxide, or acid gasses has been designed particularly for that purpose, while a respirator intended to separate out dust or the like has followed a distinctly different design. It is one of the purposes of the present invention to adapt a single respirator for a variety of purposes by the use of interchangeable filter units, each receivable in a housing of the respirator. A filter unit of the absorbent type can be made receivable in a compact space, but a difficult problem was involved in developing an equally compact filter unit interchangeable with the unit of the absorbent type in which porous material such as felt is embodied for separating out dust or the like.

Porous dust retaining material, such as felt, must be of considerable extent in surface area for adequately cleaning the air without imposing such an appreciable drop in pressure upon the air passing through the filter unit, as to be objectionable to the user.

In accordance with the present invention there is employed in the filter unit, porous dust retaining material (see Figs. II, VIII, XI, XX, XXIII, XXIV and XXVI) having convolutions permitting dust retaining material of relatively large surface area to be accommodated in a relatively restricted space.

As a further feature of the present invention there is provided a solution of the problem of testing the respirator in situ. While there are various places at which leakage may occur, and it is well to test the tightness of even the parts of the respirator itself, the leakage is most likely to occur somewhere along the contact between the rim of the mask and the face of the user. If the respirator is blocked to the passage of air in some way, applied to the face, and a test made by attempting to draw in air, any subsequent removal of the respirator means that the mask may be reapplied to the face in a slightly different position. In other words, it is impossible to be sure that the mask tightly fits the face in this second position simply because it was tight when first applied. In accordance with the present invention, a valve is provided which the user of the respirator can control so as to stop the passage of air through the filter to the interior of the mask while a test of its tightness is being made; then, without removing the mask from the face, this manually controllable valve can be operated to restore the respirator to normal operating condition.

In addition to the above, in fabricating filter units of the character described, it is particularly desirable that the filtering material be formed of a mixture of wool and silk which is graded as to size and length of fibers with the amounts of said wool and silk fibers controlled to give the desired porosity and filtering characteristics for a given thickness of material. The color of the filtering material may be controlled by mixing undyed fibrous portions with dyed fibrous portions previous to felting. In forming the filter material, particular attention is given to the thickness the said material is to possess. This thickness is preferably held within plus or minus .004 tolerance and the material is preferably approximately $\frac{1}{16}$ of an inch thick.

The porosity of the material is controlled by measuring with a gauge, which is provided for measuring resistance to air flow, a test area of 10 square inches with an air flow of 1.6 cubic feet per minute and should be from 0.65 inch to 0.8 inch. The above porosity is particularly adaptable for filters designed to protect against the so-called pneumoconiosis producing and nuisance dust. The filtering characteristics of the filter means is such that it will filter tobacco smoke with an efficiency of 50% or better.

Of course, if the filter unit is to be designed for other purposes, for example, lead dust or fumes, the pneumoconiosis filtering characteristics and consequently the resistance to air flow would necessarily have to be of a higher order of magnitude. In forming and in fabricating the material, it is particularly important that the material remains unstretched and undistorted in any direction, that is, that it be allowed to retain its natural width and dimensional and felting characteristics. The material is distinctive in that it is formed by a felting process in which the thicknesses obtained through the proper control of the type and amount of stock of fiber used does not necessitate the controlling of the thickness by a pressure process. In other words, the material has a natural thickness and porosity. It may be subjected to a light press for finishing.

The parts of a preferred embodiment of the respirator are shown as an exploded view in Fig. I, and in assembled relation in longitudinal section in Fig. III. The mask itself 20 is preferably molded of rubber to a shape conforming to the contour of the face. As shown in Figs. I and XII, the mask 20 is formed with a relatively narrow nose portion 21, cheek portions 22, and a chin portion 23. The portion 21 which is shaped to overlie the nose of the user is reinforced with a bead 25. As shown in Fig. XII, this bead is integral with the mask and extends up over the nose portion for stiffening the same.

Outlet openings 26 are formed in the cheek portions 22 and in each opening is disposed an exhalation valve 27 of suitable construction. In the embodiment illustrated in the drawings, the valve cage is in the form of two dished discs whose rims clamp between them the edges of the openings 26 in the mask.

The inner disk 28 is perforated and forms a seat for a flexible rubber disc 29 which constitutes a flap check valve. As the seat is dished, this flap valve is biased more firmly against its seat. The outer disc 30 is also perforated to exhaust the exhaled air and is held to the inner disc by a screw 31 or similar mounting member, the latter being provided with a washer 32 for securing the center of the flap valve 29 to its seat.

A housing 35 for the filter unit is carried by the mask 20. To this end a flange 36 is formed as an integral part of the mask. While the particular shape and dimensions of the housing 35 and certain details of its construction form no part of the present invention, it is within the contemplation of the present invention that the housing 35 and the filter units employed therein should be so standardized that by replacement of one type of filter unit by a filter unit of another type, as above explained, the respirator may be adapted to a variety of different uses.

The filter unit itself should be receivable within the housing 35. I prefer also that it should accommodate the cage 38 of the inhalation valve so that this cage may be mounted in the housing 35. This has at least two advantages. In the first place, the air is drawn inwardly toward the axis of the housing so as to make use of the full filtering effect of the unit and so as not to leave any straight path which the air may take in passing into the interior of the mask. In the second place, this arrangement of the cage permits the valve to be screened from the moist breath of the user by a perforated diaphragm 39, which herein forms an integral part of the mask 20. This diaphragm 39 permits the actual flow of air therethrough but functions as a condensing baffle which interferes with the dissemination of moisture back to the inhalation valve at the time that the user is breathing out past the flap valve 29.

I make use of this diaphragm 39 in conjunction with a rotary valve 40 for testing the tightness of the respirator. The valve 40 rotates on a central pin 41 and is provided with perforations 42 (see Fig. I) which register with the perforations 43 in the diaphragm 39 during normal operation of the respirator. The post or lug 44' on the rotary valve 40 extends laterally so that the operator can readily shift the perforations in the rotary valve into or out of registry with the perforations 43. Of course, when the perforations in the rotary valve are shifted completely out of registry with the perforations in the diaphragm 39, passage of air is stopped. The user can then determine by attempting to draw in air whether there is a tight fit (and also whether the exhalation valves are tight). Then without any change other than the rotation of the valve 40 so as to bring the perforations therein into registry with the perforations 43, he can restore the respirator to operative condition.

The user can in similar fashion close off the exhalation valves for making a similar test. For each of these valves I provide a perforated rotary valve 44 mounted on the neck of the screw 31 against the outside of the disc 30. The perforations in the valve 44 are moved into and out of registry with the perforations in the disc 30 through turning the rotary valve 44 by means of its lug 45.

The form of filter unit shown in Figs. I and II is of simple construction. Sheet-like porous filter material, such as felt, is arranged in folds 46 about a central opening 47. If the felt or other filtering material is not in the form of an endless belt, its ends should be secured together so that no free opening is left for the passage of air. A relatively dense felt may be employed because the volume of air-flow through any given unit area of surface is quite small and takes place at low velocity. Moreover, the air is passing toward the axis of the unit and, therefore, the particles of matter carried along with the air tend to engage the filtering material tangentially. This apparently increases the filtering effect.

The ends of the filter unit may be closed by sheets 50 and 51 of felt, or these end closures may be of impermeable material, such as aluminum or a moldable composition. As a further refinement of my improved filter unit I may surround the convolutions 46 by a continuous band 53 of more porous felt. The air entering the unit first passes through the more porous felt 53 which filters out the larger particles. This protects the less porous felt 46 from the larger particles which otherwise might fill a number of its pores and build up its resistance to the passage of air. The central opening, as above explained, accommodates the cage 38 of the inhalation valve.

This valve is preferably formed with a cylindrical cage; and as illustrated in Figs. III and IV, a flexible strip of rubber 56 is coiled within the cage. This strip is secured intermediate its ends to the cage by securing means, such as indicated at 57. When the user inhales, the air which has passed through the filter unit enters the cage through the openings 58 past the flap valve 56 and then goes axially toward the perforations in the diaphragm 39. In place of the strip 56 I may use a cylindrical valve secured by the means 57 to the cage. Such a cylindrical valve, if of thin flexible material such as rubber, will readily flex into and out of engagement with its cylindrical seat 38.

For simplicity in assembling, I have mounted the cage 38 on a portion 60 of the housing, this portion taking the form of a disc which lies between the filter unit and the flange 36 when the parts of the respirator are assembled. In an alternative arrangement, the cage is mounted in the filter unit and carried by the end closures 50 and 51 of the filter unit. Such an arrangement simplifies the structure since the disc 60 may be eliminated, but requires that each filter unit be provided with a valve cage. I employ a ring shaped washer 61 between the disc 60 and the end closure 50 of the filter unit so that air may not pass inwardly between the parts 50 and 60 so as to enter the cage 38 without passing through the filter unit. To avoid rubbing between the rotary valve 40 and the disc 60, I provide a continuous annular bead 63 on the flange 36, this bead providing air tight contact with the disc 60.

The body portion 65 of the housing 35 is a cylindrical cup, and its rim 66 is internally threaded for cooperating with a clamping ring 67 which is externally threaded. The clamping ring 67 snaps over the flange 36 and cooperates with the threaded rim 66 to assemble the filter unit within the housing 35, and draws the parts together in air tight engagement. Hooks 69 on the clamp ring 67 afford anchorage for a resilient band 70 which passes back of the head of the user for holding the mask in place.

The end of the housing 35 opposite the diaphragm 39 may be left partially open so as to expose the end closure 51, particularly if the latter be of felt. The superficial area of this end closure 51 is so small in comparison with that of the convolutions that but a small proportion of the air flowing to the valve cage 38 passes through this end closure 51; and, therefore, this end of the housing may be merely perforated or may in effect be entirely closed.

The filter unit may take various forms. Instead of the compactly folded arrangement of Fig. II, I may space the convolutions as indicated in Fig. V. With this arrangement, I prefer to extend alternate convolutions 72 closer to the axis of the unit than the remaining convolutions 73.

Figs. VI and VII illustrate a type of filter unit which is readily insertable in the housing 35 so as to surround the valve cage 38, and which can be filled with granular absorptive material, such as indicated at 75. As is well known in the art, this granular material may be activated charcoal, or other suitable material, depending upon the conditions to which the user is to be exposed. For example, in order to safeguard against acid gasses, the granular material may comprise soda lime. If the danger is from carbon monoxide, the granular material may comprise metallic oxides, such as sold under the trade name "Hopcolite." In order to safeguard against ammonia gas, the material may be compounded of charcoal and copper sulphate such as the material sold under the trade name "Cupranite." The granular material is kept in place by inner and outer annular screens 76 and 77. Each screen is preferably lined with an annular sheet of thin pervious material 78, such as cotton felt.

In order to provide a compact arrangement of porous filtering material such as felt, it is not necessary that the latter be in the shape of a long band. Instead I may employ a filter which has the general form of a cone, as illustrated in broken lines in Fig. VIII. This conical filter is then folded into nested convolutions, as indicated at 80 in Fig. VIII. The filter thus folded may be inserted within the housing 65, as shown in Fig. IX, with its flange or edge portion 80a clamped against the disc 60 by an annular ring 81 as indicated more in detail in Fig. XVII. The ring 81 carries a plurality of legs 81' for spacing it from the bottom of the cup 65.

Instead of a conical filter I may employ a bellows type filter 82, as indicated in Figs. X and XI. I find it convenient to form such a filter from separate pieces, a, b, c, etc., of felt which are sewn at their meeting edges to form the bellows 82. This type of filter has the central opening 47 which permits its use with a cage 38 in the manner indicated in Figs. III and IX.

One of the important advantages afforded by a respirator embodying the present invention is that it is not necessary to keep on hand a different type of respirator for each hazard; but instead, the same mask and housing may be employed with a variety of different types of filter units.

A further advantage lies in the compactness of the filter unit. This is of particular importance with relation to porous filtering material, such as felt, since the effectiveness of the filter is indeed increased while restricting the space required in the housing for receiving the unit. This advantage is due to the arrangement of the filtering material in folds; since a dense dust retention material may be utilized when employing a larger surface area.

A further advantage is the increased filtering effect due to the path of travel of the air toward the axis of the housing so that the particles tend to hit the fibrous surface tangentially.

The shielding of the inhalation valve by the interposed baffle 39 is also of advantage as it tends to prevent the condensation of moisture within the valve cage 38. This is particularly important in cold weather when such moisture might freeze so as to interfere with the proper operation of this valve.

In fabricating a filter unit, such as illustrated in Figs. I, II and XXX and as illustrated in Figs. XVIII to XXII inclusive and XXVI to XXX inclusive, a ribbon-like strip of filtering material 85 having desired filtering chaacteristics is placed on a form 86. This form comprises a plurality of radially extending plate-like members 87 arranged in controlled spaced relation with each other and having a width substantially equal to the width of the ribbon-like material to be folded. The ribbon-like material 85 is placed on the form 86 by anchoring one end thereof 88 inwardly of a space formed by a pair of radially extending members 87. The end 88 is held therein by a wedge or the like 89. A tool, such as illustrated at 90, is used for pressing the material inwardly of the spaces of the form 86 as diagrammatically illustrated in Fig. XX. This is accomplished by successively folding the ribbon-like material over the radially extending members and by placing wedge-like members 89 inwardly of the spaces between said radially extending members. When the material has been placed in each of the spaces about the form 86 the ends 91, as illustrated in Fig. XXVI, are joined by a suitable adhesive or cement. A suitable annular member 92 is placed over the various wedges 89, as illustrated in Figs. XX and XXI, to hold them in place after the material has been folded in fitted relation with the form 86. This holds the parts in assembled relation with each other ready to be heat treated to cause the filter material to assume the shape of the former 86 and to retain said shape when the parts are dissociated. The form 86 is provided with a central opening 93 to which is attached a suitable supporting bracket 94 by which the filter may be suspended internally of a heating chamber 95, as illustrated in Fig. XXII. This chamber is provided with an inlet 96 and an outlet 97 through which steam may be first directed to the chamber to cause the fibers of the material to react under said steam so as to assume the shape of the form 86. After the filter units have been treated by steam or the like the steam is shut off and hot air is directed into said chamber 95 to dry out the filtering material and set the fibers to the shape which they have assumed. This drying is carried out while the filtering material is in assembled relation with the former 86 and the associated retaining parts thereof. The forming units are then removed from the chamber and allowed to cool.

A suitable drain 98a is provided for removing condensations from the heating chamber 95.

After the molding units have been allowed to cool, the ring 92 is removed and the various wedges 89 are also removed. A suitable collar 98 having a width substantially less than the width of the filtering material 85 is then clamped onto said material with the form 86 therein, see Figs. XXVI and XXVII. A shouldered ring 99 is then placed over one end of the assembly in abutting relation with an edge of the collar 98. It is particularly pointed out that the filter material is allowed to protrude slightly inwardly of the shouldered portion of the ring 99, as illustrated at 100. A closure member 101 in the form of a disc having a coating of adhesive 102 thereon is then fitted within the shoulder of the ring 99 and is pressed into engagement with the protruding edge 100 of the filter material. The adhesive 102 seals the disc or closure member 101 to the edges 100 of the various folds. The assembly is then allowed to stand until the adhesive dries or has set. The adhesive in this particular instance is preferably a latex cement which has an inherent yielding characteristic after it has set. It is to be understood, however, that any other desirable adhesive might be used. The form 86 is then removed and the shouldered ring 99 is placed on the opposite side of the collar 98 as illustrated in Fig. XXX. It is particularly pointed out that the shouldered ring 99 functions as positioning means for locating the discs or side closure members 101 in desired aligned relation with the filter material 85. A second closure member or disc 103, such as illustrated in Figs. XXIX and XXX, having a coating of adhesive 104 thereon of similar characteristics to the adhesive 102 is then located within the shouldered ring 99 and secured to the opposite side of the folded filter material 85. It is particularly pointed out that the disc or closure member 103 is, in this instance, provided with a hollow spacer member 105. It is secured to the disc 103 through the provision of a circumferential raised portion 106 which engages a washer member 107 placed on one side of the disc 103 and which has its adjacent end 108 open over a similar washer 109 on the opposite side of the disc 103. This positively anchors the hollow spacer member 105 to the disc 103 and seals the said hollow member to said disc. In assembling the disc 103 to the folded material 85 the end of the hollow member 105 which has an end wall 110 is provided with a coating of adhesive 111. This seals the end wall 110 with the disc 101 and functions to retain the discs 101 and 103 in positive spaced relation with each other and prevent twisting or torsional strain on the folded filter material 85 when the said filter is in use. After the disc 103 and associated spacer member 105 is assembled with the other associated parts of the filter unit the collar 98 and ring 99 are removed. It being understood that the adhesive has been previously allowed to set so as to maintain a binding relation with the associated parts of the filter. The hollow spacer member 105 in addition to functioning as a spacer member for the discs 101 and 103 is provided with a plurality of openings 112 of sufficient area of opening to eliminate any resistance to passage of air. A flat valve member formed of resilient material 113 is located in superimposed relation with the openings 112 and is retained internally of the hollow support 105 by spaced headed pin members or the like 114. The valve member 113 is secured intermediate its ends by the headed pin members 114 and has two free ends which are adapted to move toward and away from superimposed relation with the openings 112 during respiration. It is particularly pointed out that the sheet material of the valve 113 is initially flat so that when it is curled to be fitted within the opening in the holow member 105 its inherent tendency to return to its initial set will cause the said valve to maintain its superimposed relation with the openings 112.

The collar 98 and ring 99 are formed in two sections joined by a hinge 115 adjacent a pair of the meeting ends thereof and are provided with a suitable clip 116 for holding them in position on the filter form 86.

The discs or closure members 101 and 103 may be formed of material having similar characteristics as the ribbon-like filtering material 85 or may be formed of impervious or solid material. In the latter instance, the discs are preferably relatively rigid. It is apparent that if desired material having similar characteristics as the filtering material 85 may be used for the discs 101 and 103 in which instance if it is desired to have the said discs impermeable they may be treated with a suitable ingredient such as paint or a similar filler for rendering them to this state. In Figs. XXIII to XXV inclusive, there is illustrated a modified type of filter forming means. In this instance, a plurality of formers 116 simulating the form 86 may be placed in aligned relation with each other and be held in said relation by interfitting male and female members 117. In this instance, the forms 116 are provided with bosses 118 on one side thereof so as to provide a space 119 between said forms. In this instance, a sheet of filtering material such as illustrated in Fig. XXXI having a width sufficient to overlie the aligned forms 116, is placed in fitted relation with the spacing prongs 120 of said forms. In this instance, a tool 121 having a roller 122 of a length sufficient to span the material is used in positioning the material on the forms 116. Wedges 123, which are similar except for length to the wedges 89, are used in holding the folded material on the forms 116 and suitable rings 123 similar to the rings 92 are used to hold the wedges in place. The length of the wedge is determined by the number of folds desired.

It is particularly pointed out that the various wedges 89 or 123, as the case may be, and the spaced relation of the prongs 120 are so dimensioned as to avoid excess pressure on the sides of the folded material, that is, they are so dimensioned that the space between the side walls of the wedges and the adjacent prongs 120 or the like is substantially equal to the thickness of the filter material and is so designed that when the material is subjected to the steam treatment it will be retained by the side walls of the prongs and the side walls of the wedges to the initial thickness which said material possesses. By reason of this fact, the filtering characteristics of the material are not altered during the forming and treating thereof to retain the shape to which it is formed.

After the filter material has been placed on the aligned forms 116, as illustrated in Fig. XXIII, the complete assembly is placed in a steam chamber, such as illustrated at 95, and is carried through the same steps of the process as the filter unit shown in Fig. XXVI. The assembly is then removed from the chamber, is allowed to cool and is then cut adjacent the grooves 119. The various forms 116 are then separated and the closure members or discs are secured to the sides thereof in a manner similar to that set forth above. It is to be understood that although only three of the formers 110 are illustrated in Fig. XXIII, that any number of aligned formers may be used, it only being necessary to control the width of the material so as to be of a sufficient width to overlie said formers.

Filter units of this character are adapted to be retained in place on the face piece 22, illustrated in Fig. I, and are held thereon by the housing 35 in a similar manner to the filter unit 50. The annular resilient ring 63 functions as means for sealing the adjacent side wall of the filter to the face piece.

It is to be understood that although applicant has shown and described a housing 35 for retaining the filter on the face piece any other desirable means might be used which will seal the filter to the face piece.

The filter material has the characteristics of the filter material set forth above and is controlled as to its porosity and filtering characteristics according to the use to which it is to be put.

The purpose of arranging the filter material in a plurality of folds, such as set out above, is to provide a filter having increased filtering area in a relatively confined space and is adapted to form a filter unit having all of its parts integrally related so that it may be handled as a single unit so that the said filters may be quickly and easily interchanged. The purpose of arranging the folds in a central direction is to arrange the side walls of the folds in a direction substantially normal to the direction of the flow of air entering the filter. This aids in preventing clogging of the filter unit during use as dust, dirt and so forth filtered from the air entering the filter unit will be disposed on the side walls of the folds in a tangential direction and has a tendency to impinge on the surface rather than penetrate into the pores of the filter. The filters may be cleansed by blowing out dust with compressed air, which is introduced either on the surface or internally of the filter unit. It is apparent that the filter unit possesses the characteristics which renders it readily adaptable to introduction of air internally for cleansing. It is particularly pointed out that, when interchanging filter units, there are only a minor number of parts which must be separated so that the said filter units will be quickly and easily interchanged and because of the fact that the parts of the filter units are sealed in integral relation with each other only one seal is necessary with the face piece in order to insure against leakage during use. It is to be understood that while the filter material may be of any known filtering type, it is preferably formed of silk and wool of controlled amounts since it has been found that combinations of these two fibers yield filter felts possessing superior dust filtering characteristics and allows the filter material to possess in thinner sections filtering characteristics equal to felts made, for example, of all wool fibers or cottons in thicker sections and also forms a filter material which will permit ease of breathing during use while affording proper filtering characteristics. The combination of silk and wool, therefore, is set forth only by way of illustration of how a desirable type of filtering material may be formed. It is to be understood that filter means formed of separate micro-porous rubber and other foraminous materials might be used.

While I have illustrated and described certain preferred embodiments of my invention, it will be understood that the invention may be otherwise embodied and practiced within the scope of the following claims.

Having described my invention, I claim:

1. In a respirator the combination of a face piece having an inlet opening therein and attaching means adjacent said opening, filter means of a self-contained type capable of handling as an individual unit comprising spaced members having impermeable characteristics, one of which has an opening therein and filter material arranged in folds about said opening and extending substantially radially relative to the center of said opening with the opposed edges of the folds sealed with said spaced members and with the folds lying within the limits of the contour edges of said members, a valve member comprising a tubular portion projecting inwardly of the opening in said spaced member and between the central folds of said filter means, said tubular portion having one end thereof sealed and a flange-like portion adjacent its opposed end adapted to lie between a side member of the filter means and the face piece, said tubular portion having an opening in the side wall thereof with resilient valve means overlying said opening and means constituting a hollow housing fitting over said filter means and having means for connection with the attaching means adjacent the opening in the face piece for securing the filter means and valve member to said face piece.

2. In a respirator the combination of a face piece having an inlet opening therein and attaching means adjacent said opening, filter means of a self-contained type capable of handling as an individual unit comprising spaced members having impermeable characteristics, one of which has an opening therein and filter material arranged in folds about said opening and extending substantially radially relative to the center of said opening with the opposed edges of the folds sealed with said space members and with the folds lying within the limits of the contour edges of said members, a valve member comprising a tubular portion projecting inwardly of the opening in said spaced member and between the central folds of said filter means, said tubular portion having one end thereof sealed and a flange-like portion adjacent its opposed end adapted to lie between a side member of the filter means and the face piece, said tubular portion having an opening in the side wall thereof with resilient valve means overlying said opening, means constituting a hollow housing fitting over said filter means and having means for connection with the attaching means adjacent the opening in the face piece for securing the filter means and valve member to said face piece and shutter means overlying said face piece opening and operable to open and close said opening.

3. A respirator comprising a hollow face piece shaped to overlie the nose and mouth and having a resilient edge portion shaped to engage the face, said face piece having an exhalation opening and an inhalation opening therein, an attachment member of relatively flat material having an opening therein aligned with the inhalation opening and secured throughout the contour of its opening with the contour of the inhalation opening and having a rim portion of a diameter considerably greater than the diameter of the inhalation opening and shaped to provide attachment means extending outwardly in a direction away from the face piece, said attachment member having a side bearing surface, a hollow filter unit composed essentially of ribbon-like filtering material arranged in folds extending substantially radially about a central opening with the plane of said folds lying substantially in the direction of the longitudinal axis of said central opening of the filter and disc-like members secured in sealed relation with the opposed edges of said folded ribbon-like material and in substantially parallel relation with each other to complete the hollow filter unit and render said unit separable from the respirator without altering the sealed relation of the disc-like members with the filtering material, one of said discs having an opening therein communicating with the central opening about which the ribbon-like material is folded, the said disc having an opening therein being positioned adjacent the side bearing surface of the attachment member and binding means connected with the rim portion of the attachment member and engaging a portion of the filter member and relatively intimately pressure sealing said filter member with the side bearing surface of the attachment member with the opening of the disc and the central opening of the filter member communicating with the inhalation opening, said filtering unit being the sole filtering means of the respirator.

4. A respirator comprising a hollow face piece of resilient material shaped to overlie the nose and mouth and having an integral resilient edge portion shaped to engage the face, said face piece having an exhalation opening and an inhalation opening therein, a filter attachment member having a relatively flat disc-like portion with an opening therein aligned with the inhalation opening and secured throughout the contour of its opening with the contour of the inhalation opening and having an annular rim portion of a diameter considerably greater than the diameter of the inhalation opening in the face piece and being provided with threaded connecting means, said filter attachment member having a side bearing surface inwardly of the annular rim portion, a separable hollow filter unit composed essentially of ribbon-like filtering material arranged in folds extending substantially radially about a central opening with the plane of said folds lying substantially in the direction of the longitudinal axis of said central opening of the filter and having circular disc-like members adhesively secured in sealed relation with the opposed edges of said ribbon-like filtering material and in substantially parallel relation with each other to complete the separable unit which may be removed without disassociation of the disc with the filtering material, one of said discs having an opening therein communicating with the central opening about which the ribbon-like material is folded, the said disc having an opening therein being positioned within the limits of the annular rim portion of the attachment means and having a side surface in substantially parallel relation with the side bearing surface of said attachment means and a perforated housing shaped substantially to the shape of the filter means fitted over said filter means and having an edge portion provided with thread means threadedly connected with the threaded portion of the annular rim portion of the attachment member and being adapted, through the action of threading the housing to the annular rim portion, to force a portion of said housing into engaged relation with a portion of said filter unit to cause the disc-like portion of said filter means having the opening therein to be pressed toward the side bearing surface of the attachment means to seal the opening in said disc and the central opening of the filter member in communicating relation with the inhalation opening, said filtering unit being the sole filtering means of the respirator.

5. A respirator comprising a hollow face piece of resilient material shaped to overlie the nose and mouth and having an integral resilient edge portion shaped to engage the face, said face piece having an exhalation opening in the wall thereof and an inhalation opening in the front thereof and an integral flange-like portion surrounding said inhalation opening with the flange-like portion spaced relative to the adjacent wall of the face piece and having an outer ridged side bearing surface, a disc-like attachment portion having an opening therein of a diameter less than the diameter of the flange-like portion attached to said flange-like portion with the major portion of the disc lying in the space between said flange-like portion and the face piece, said disc-like attachment portion having an outer annular rim portion extending outwardly of the flange-like portion and having connection means thereon, a filter unit composed essentially of ribbon-like filtering material arranged in folds extending substantially radially about a central opening with the plane of the folds lying substantially in the direction of the longitudinal axis of said central opening of the filter and disc-like members adhesively secured in sealed relation with the opposed edges of said folded ribbon-like material and in substantially parallel relation with each other to produce a hollow filter unit composed solely of said ribbon-like material and said disc-like members and which may be separated from the respirator without disassociation of the disc-like members from said ribbon-like material, one of said discs having an opening therein communicating with the central opening about which the ribbon-like material is folded, the said disc having the opening therein being adapted to be positioned in engagement with the outer ridged side bearing surface of the flange with its opening communicating with the inhalation opening of the face piece and a hollow cap-like member having perforations therein fitting over said filter member with the side walls thereof overlying the outer folds of the filtering material in adjacent relation therewith and having connection means adjacent one of the edges of the side wall thereof adapted to be connected with the connection means of the annular rim portion with the said cap-like portion bearing on a portion of the filter means and causing the disc-like member having the opening therein to be forced into relatively intimately sealed relation with the ridged side bearing surface of the flange-like portion with the opening in said disc-like member communicating with the inhalation opening, said filter unit being the sole filtering means of the respirator.

WILLIAM H. LEHMBERG.